United States Patent
Rudd

[11] 3,908,144
[45] Sept. 23, 1975

[54] HEADLIGHT
[76] Inventor: Eugene D. Rudd, 3929a Cleveland Ave., St. Louis, Mo. 63110
[22] Filed: June 3, 1974
[21] Appl. No.: 475,405

[52] U.S. Cl............ 313/114; 240/7.1 R; 240/8.1 R; 240/41.35 R; 313/115
[51] Int. Cl.².... H01K 1/30; B60Q 1/04; B60Q 1/26
[58] Field of Search.......... 240/7.1 A, 7.1 R, 7.1 F, 240/8.1 R, 8.41, 41.2, 41.3, 41.35 R, 8.3; 313/113-115; 315/82, 83

[56] References Cited
UNITED STATES PATENTS

| | | | |
|---|---|---|---|
| 1,702,429 | 2/1929 | Donley | 240/7.1 F |
| 1,836,608 | 12/1931 | May | 240/7.1 E |
| 2,791,713 | 5/1957 | Dean | 313/113 X |
| 3,622,778 | 11/1971 | Cibie | 240/41.35 R |
| 3,840,776 | 10/1974 | Takeda et al. | 315/82 |

Primary Examiner—Alfred L. Brody
Attorney, Agent, or Firm—John D. Pope, III

[57] ABSTRACT

A sealed beam headlight has an additional source of light located outside the line of the main light beam but located adjacent a colored disc in the lens of the light. A separate circuit controls the additional source of light and is connected to the brake pedal of an automobile. The headlight accordingly not only provides forward illumination when required, but also signals operation of the braking system of the vehicle to those who can see the front of the vehicle.

5 Claims, 6 Drawing Figures

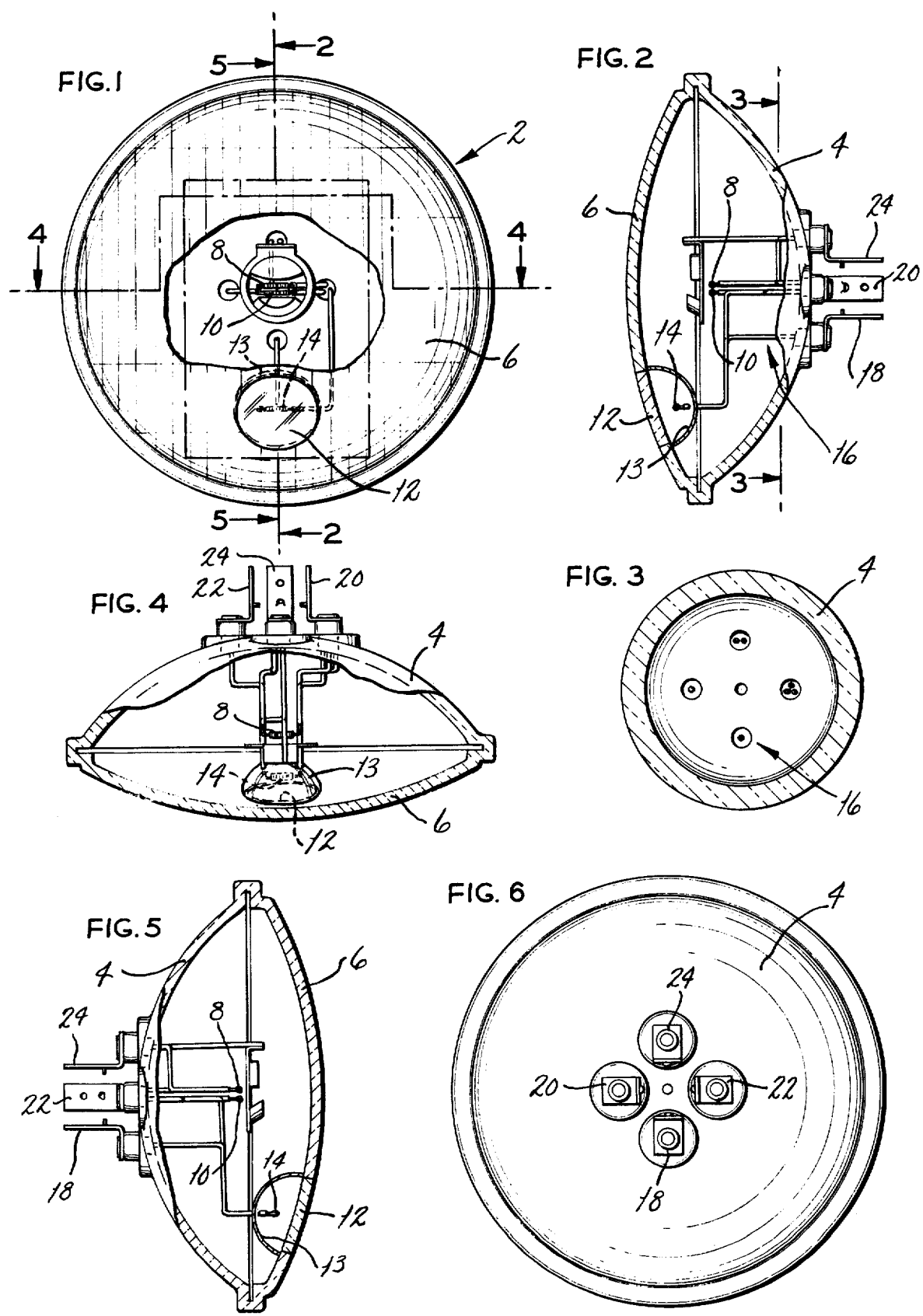

HEADLIGHT

The present invention relates to headlights for an automobile or other vehicle and particularly to sealed beam headlights. These headlights include a warning singal which operates in response to actuation of the braking system independently of and not connected to the power system for the general lighting system of the vehicle.

For many years it has been standard practice to incorporate warning lights operated by the braking system of the vehicle into the rear of automobiles and other vehicles. Such warning lights signal operation of the braking system at an earlier point than observation of decreasing speed of the vehicle could accomplish. Although such systems are relatively universal for the rear portions of vehicles, they are not incorporated into the front portions thereof.

Among the several objects of the present invention are the provision of sealed beam headlights similar in construction to those in current use but incorporating a warning light, the provision of headlights of the sealed beam type which include a warning signal not connected to the switching system for the headlights but connected to the brake light switch of the vehicle; and the provision of sealed beam headlights of the type indicated which may be readily manufactured and which may be incorporated into vehicles without basic changes in the vehicle construction. Other objects and features will be in part apparent and in part pointed out hereinafter.

The invention accordingly comprises the constructions hereinafter described, the scope of the invention being indicated in the following claims.

While the necessary signals on the rear of a vehicle indicating operation of the braking system of the vehicle are well known, there are many instances where a similar warning system on the front of the vehicle would not only be valuable to other vehicle operators but to pedestrians as well, and which would function as a valuable safety device. When vehicles are stationary at an intersection, for example, one can determine from the rear of the vehicle, if the rear is visible, whether or not the operator has the brakes in operative position. This is not apparent, however, from the front of the vehicle so that pedestrians and other drivers may be uncertain and therefore at hazard for lack of knowledge as to the status of the vehicle in question. Without seeing the rear of the vehicle it may be certain whether the driver of the vehicle intends to remain stopped for the moment or whether he is about to accelerate.

A similar situation occurs in moving traffic. It is readily determined when the operator of the car ahead applies his brakes but this is not at all apparent as to the operator of the vehicle following. Such a vehicle may be readily apparent in a rear view mirror but one can only guess whether the vehicle is proceeding at a predetermined speed, accelerating or is deaccelerating with the help of brakes. If it becomes necessary to stop suddenly one can only hope that ones own signals have been noted by the vehicle following with no assurance that action is being taken until it may be too late to escape.

In the accompanying drawings, in which one of various possible embodiments of the invention is illustrated, FIG. 1 is an elevation of a headlight of the present invention;

FIG. 2 is a section taken on the line 2—2 on FIG. 1 looking to the left;

FIG. 3 is a section taken on the line 3—3 on FIG. 2;

FIG. 4 is a section taken on the line 4—4 on FIG. 1;

FIG. 5 is a section taken on the line 5—5 on FIG. 1 looking to the right; and

FIG. 6 is a rear elevation.

Corresponding reference characters indicate corresponding parts throughout the several views of the drawings.

Referring now to the drawings, the headlight of the present invention consists of a sealed beam headlight of the standard type 2. Headlight 2 includes a parabolic reflector 4, a lens 6 and light sources 8 and 10. Light sources 8 and 10 are located at the apex of the horizontally extending axis of the reflector to provide two qualities of light, one for city driving and the other for highway driving. Headlight 2, however, differs from the standard sealed beam headlight because of an inserted colored disc 12 in lens 6, a secondary parabolic reflector 13, and an adjacent light source 14 which illuminates disc 12. Light source 14 is not connected to the circuit which operates light sources 8 and 10 but has a separate circuit 16 connected to the brake pedal of the vehicle in the same manner that the standard warning lights displayed on the rear of the vehicle are connected. Energization of circuit 16 therefore is independent of the energization of the circuits controlling lights 8 and 10. It is however correlated with energization of the circuit to the warning lights located on the rear of the vehicle. Reflector 13 not only aids in illuminating disc 12 but shields disc 12 from illumination by light sources 8 and 10.

To accommodate the headlight of the present invention an additional circuit is run from the brake pedal to the front of the vehicle and terminates in a receptacle positioned to receive a prong 18 on light 2. Prong 18 is similar in construction to the customary prongs 20, 22 and 24 utilized on sealed beam headlights to control the circuits of lights 8 and 10. Prong 18 however connects to the power in circuit 16 and in cooperation with prong 20 which is the ground, completes circuit 16. Ground prong 20 of course likewise completes circuits with prongs 22 and 24 to operate lights 8 and 10.

The color of disc 12 is not critical but should be distinctive so as to be readily noted and its warning message understood. Any readily visible color may be used such as red or orange.

When the light of the present invention is installed on a vehicle its warning message is readily understood in the same way that the warning message of brake operated lights on the rear of a vehicle is understood. Operation of light 14 signals to all who may be able to see the front of the vehicle that the driver is applying his brakes. Pedestrians crossing an intersection, for example, are informed not only as to whether the vehicle's brakes are on but disappearance of the light is prompt warning that the driver has released the brake and may be expected to move the vehicle forward. If the warning lights are seen by means of the rear view mirror, on a following vehicle, the message is immediately transmitted that the operator of the following vehicle is deaccelerating, utilizing his brakes.

The headlights of the present invention are therefore not only a safety device since they transmit knowledge to all who see them that the vehicle's brakes are either being applied or not, but such a message is not dependent on any act of the operator of the vehicle apart from his operation of the vehicle's brakes themselves.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A sealed beam headlight having a first parabolic reflector with a horizontally extending axis, a first light source carried by said reflector and located adjacent said axis, and a lens integrally formed with said reflector, characterized by a second light source carried by a second parabolic reflector located away from the axis of said first reflector, and a colored insert in said lens located away from the axis of said first reflector, said second light source being located in the axis of said second reflector adjacent to the insert in the lens, said second parabolic reflector substantially surrounding said second light source and shielding said colored insert from light emitted by said first light source, said second light source being connected to its own power terminal for connection in a circuit other than a circuit in which said first light source is connected.

2. A headlight according to claim 1 in which each light source emits white light.

3. A headlight according to claim 2 in which the colored insert is a color readily visible.

4. A headlight according to claim 3 in which the second light source and the colored insert are located below the axis of the reflector.

5. A headlight according to claim 4 in which said first light source includes two lights both located adjacent said axis.

* * * * *